United States Patent [19]

Weber

[11] 4,023,525
[45] May 17, 1977

[54] SEED TREATER
[75] Inventor: Joseph A. Weber, Arlington, Tex.
[73] Assignee: Gustafson, Inc., Hopkins, Minn.
[22] Filed: Aug. 4, 1976
[21] Appl. No.: 711,560
[52] U.S. Cl. .............................. 118/303; 134/132
[51] Int. Cl.² ........................................ B05C 5/00
[58] Field of Search ............... 118/7, 303, 25, 19, 118/427; 427/212, 242, 421; 239/336, 398, 549; 134/132; 198/213; 259/7

[56] References Cited
UNITED STATES PATENTS

| 3,734,777 | 5/1973 | Bratschitsch | 134/132 |
| 3,841,263 | 10/1974 | Rohloff | 118/303 |
| 3,967,005 | 6/1976 | Cattaneo | 118/303 X |
| 3,968,771 | 7/1976 | Walgenbach | 118/303 |

Primary Examiner—Louis K. Rimrodt
Attorney, Agent, or Firm—H. Dale Palmatier

[57] ABSTRACT

Seed treating and conveying apparatus including a screw conveyor with an auger and an auger shaft operating within the auger tube and driven by a motor, an eccentric or cam rotated in direct relation to the rate of rotation of the auger shaft and operating a reciprocating positive displacement metering pump, the displacement of the impeller rod of the pump being adjustable to vary the quantity of liquid treating material applied to the seed in the auger tube during each revolution of the auger.

15 Claims, 13 Drawing Figures

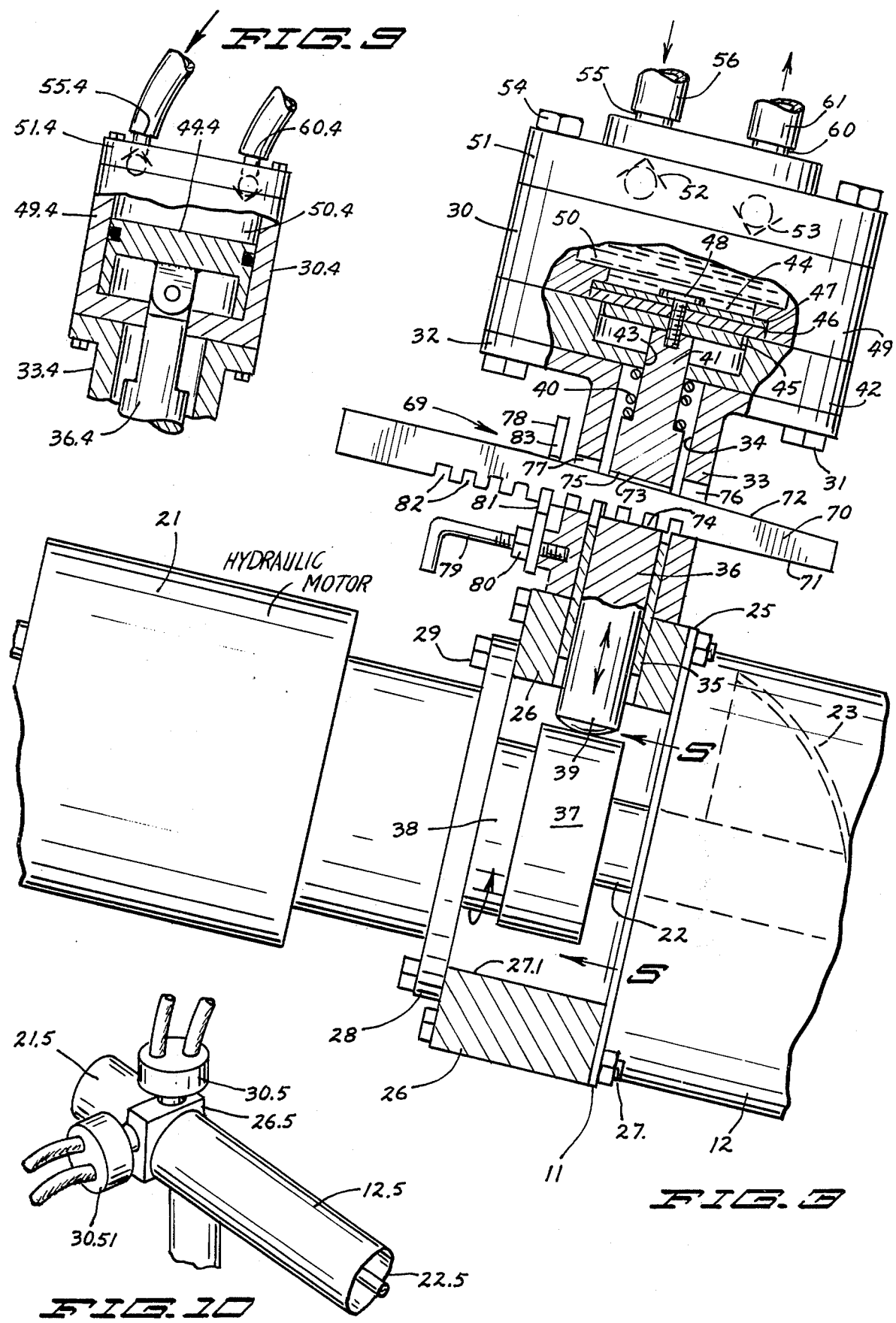

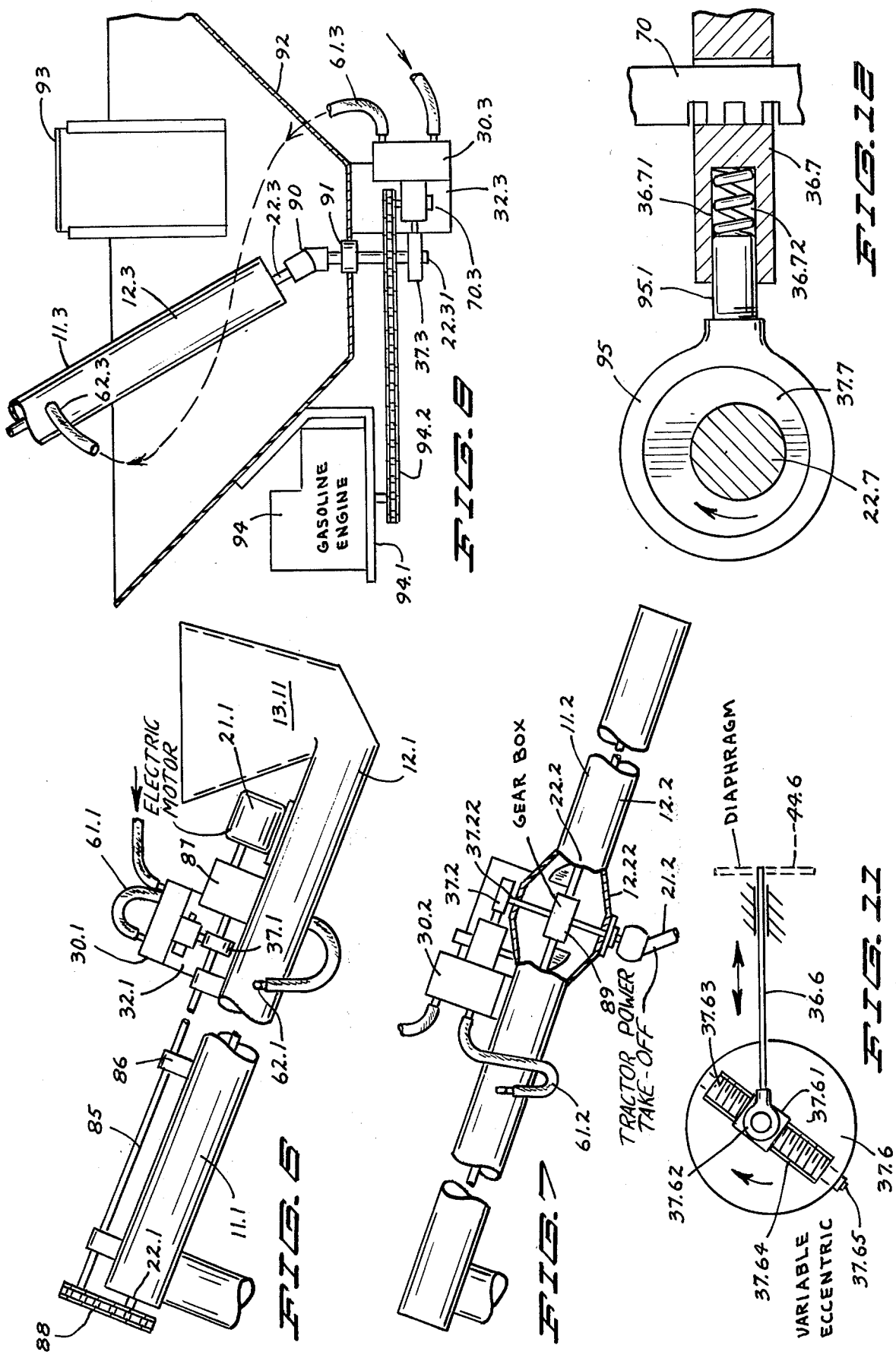

SEED TREATER

This invention relates to a seed treating apparatus for applying a liquid base treating chemical or inoculant or similar material to seeds.

BACKGROUND OF THE INVENTION

In most instances in the past, the application of treating materials to seeds has been done in commercial processing plants. Some difficulties have been encountered with such processed seed which has been diverted for purposes other than use as seed. Of course, great care must be taken that such treated seed will not be diverted to human consumption. Government regulations closely control the handling of such treated seed in transport and storage. Further, when seed has been treated ahead of time, it has been found that the seed treating materials may start to break down when exposed to air, and, of course, this results in loss of some of the strength and effectiveness of the treating materials.

One prior apparatus, disclosed in U.S. Pat. No. 3,841,263, suggests the injecting of treating material into an auger tube by an electric fuel pump energized simultaneously with the electric drive motor for the auger. This arrangement has many difficulties because many, if not most, screw conveyors are driven with sources of power other than electric motors; and further, the quantity of treating material applied to the grain relates to a number of factors which are not related directly to the flow of the grain, and therefore it is likely that inadequate or excessive amounts of treating material will be applied to the seed grain traveling in the auger tube.

SUMMARY OF THE INVENTION

The present invention makes it possible to treat seed at as late a time as if possible prior to planting the seed and regulates the application of treating material to the seed so that a highly accurate measure of treating material can be applied only as the seed travels in the screw conveyor to be disposited in the storage hoppers of seed drills and other planting equipment. The treating chemicals are maintained at full strength, but excessive quantities are not applied so that maximum effect at a minimum expense can be obtained. Of course, because the seed is treated at the last possible moment before the seed is run into the grain drill, there is an absolute minimum likelihood that treated seed will be diverted for other purposes. Difficult government regulations will be very easily complied with.

The present invention applies treating materials to the seed as the grain or seed is being conveyed from the bulk containers in which the seed is transported to the field. A metering pump for the treating material is attached and operated directly by the screw conveyor and driven by the screw shaft at a speed directly proportional to the speed at which the screw is turned and directionaly proportional to the rate at which the grain is being moved through the conveyor. The treating material is pumped by the metering pump from a source carried directly adjacent the bulk container and screw conveyor. A range of quantities of treating material may be pumped for each revolution of the auger in the screw conveyor.

It is important to note the present invention provides for the accurate proportioning of the treating materials to the quantity of seed being processed. In the event that there is a reduction or increase in the rate at which the seeds are being handled, there is an automatic proportional reduction or change in the rate at which the treating material is applied to the seed.

It should further be noted that the type of seeds which are contemplated for use with this equipment includes an extremely broad range of different types of seeds including all of the small grains such as wheat, oats, barley, rye and other similar seeds, and also includes such diverse seeds as soybeans, corn legumes, sunflowers and all of the various vegetable seeds planted in truck garden type operations.

Most of the common treatments applied to seeds may be handled with a liquid carrier. In addition, seeds may be additionally treated with various preservatives and insecticides in this way.

DESCRIPTION OF THE DRAWINGS

FIG. 3 is an enlarged detail section view of the treating material pumping and proportioning apparatus.

FIG. 6 is an elevation view illustrating a modified form of the invention.

FIG. 7 is an elevation view of a second modified form of the invention.

FIG. 8 is a partly diagrammatic sketch illustrating a third modification of the invention.

FIG. 9 is a detail section view illustrating a piston pump which may be used to replace the diaphragm pump of FIG. 3.

FIG. 10 illustrates a modified form showing an additional metering pump for a different treating material.

FIG. 11 is a diagrammatic sketch illustrating another drive for the metering pump.

FIG. 12 is a diagrammatic sketch showing still another drive for the metering pump.

DETAILED SPECIFICATION

Figure 1:
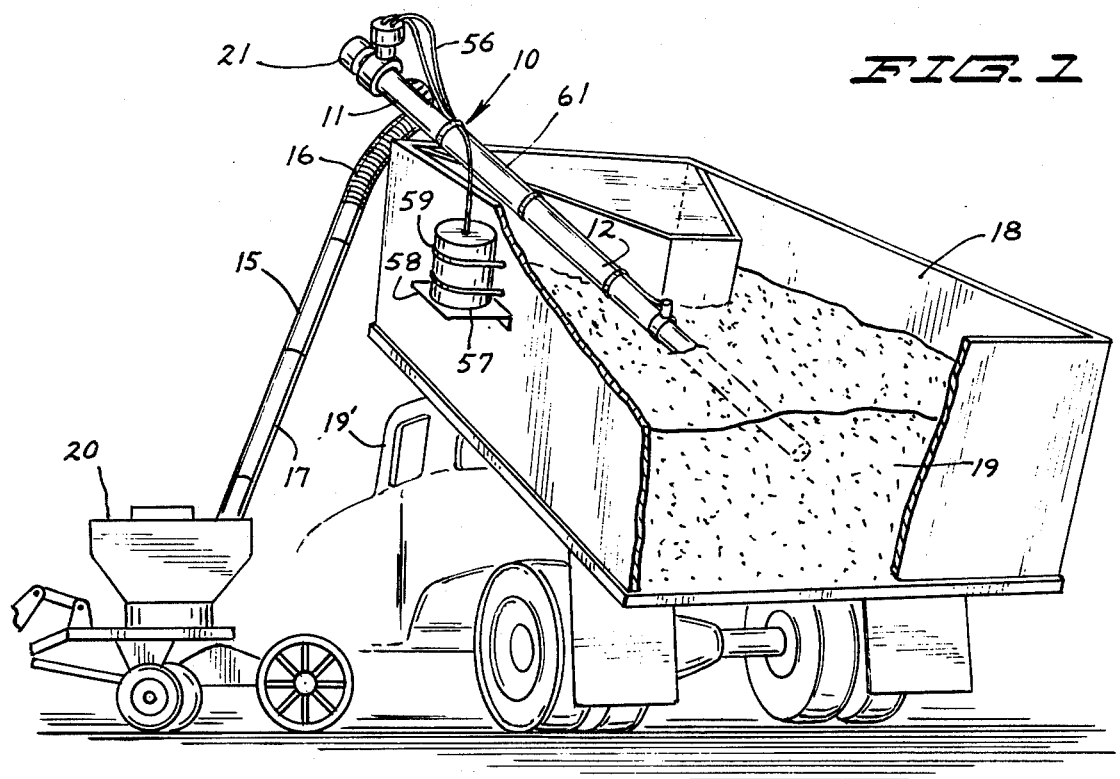
FIG. 1 is a perspective view showing the general nature of the equipment for treating seeds as the seeds are being loaded into planting equipment.
Figure 2:
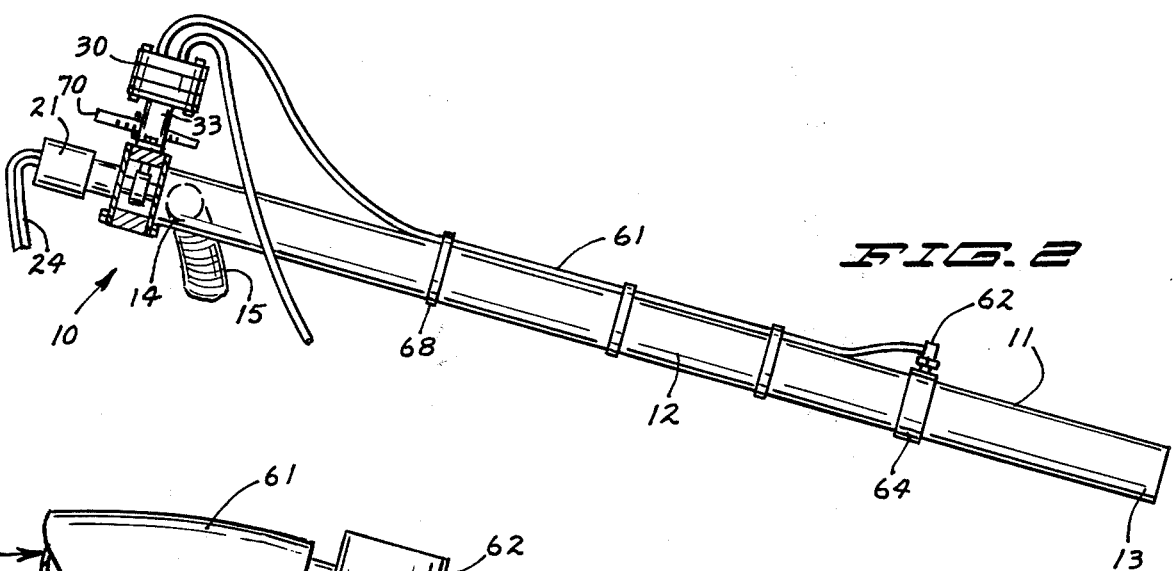
FIG. 2 is an elevation view of the seed conveying and treating equipment.
Figure 4:
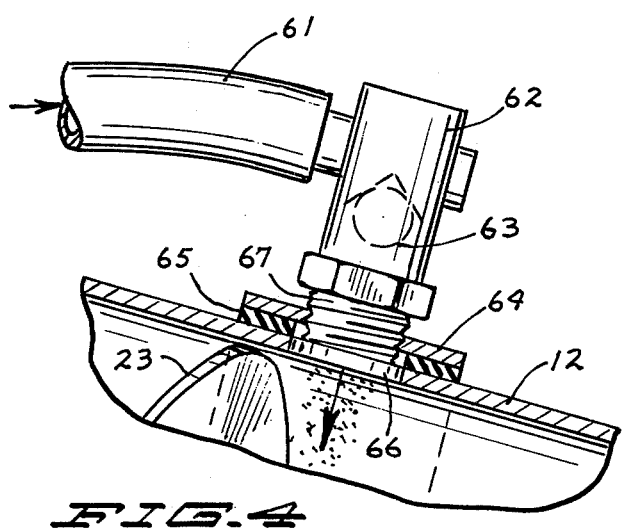
FIG. 4 is an enlarged detail view illustrating the application of treating material into the auger tube of the screw conveyor.
Figure 5:
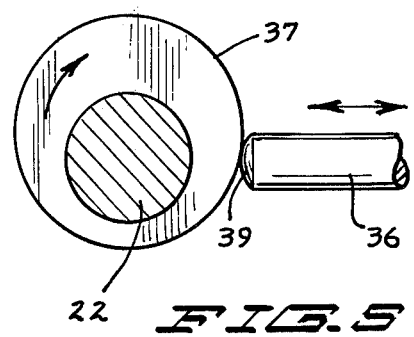
FIG. 5 is a detail section view at 5—5 of FIG. 3.

The form of the invention illustrated in FIGS. 1 – 5 comprises a combined seed conveying and treating apparatus, indicated in general by numeral 10 which includes a screw conveyor of the type which is commonly used for conveying grain and similar particulate material, the screw conveyor being indicated in general by numeral 11. The screw conveyor 11 has a cylindrical auger tube 12 having an open seed receiving lower end 13 and a closed upper discharge end 14 which is provided with a discharge chute 15 extending transversely away from the auger tube 12 and may be partly flexible as indicated at 16 and partly rigid tube or chute as indicated at 17.

This screw conveyor 11 is commonly used for unloading a bulk container or seed box 18 which forms a part of a truck 19', and loading the seed grain 19 into planting equipment indicated in general by numeral 20. Such planting equipment may be grain drills, corn planters, etc. In this instance, the box 18 is a dump box mounted on the truck frame, but could as well be a box carried on a wagon frame towed behind a truck or tractor. The truck 19, or a tractor, if the box 18 is towed behind a tractor, provides the necessary auxiliary power for operating the screw conveyor 11. In this illustrated version, a motor 21 is powered from the hydraulic fluid system of the truck and will turn the auger shaft 22 of the screw conveyor and the auger 23 which is affixed as by welding to the auger shaft. In other circumstances, depending upon the arrangement of the screw conveyor 11, the auger shaft may be driven by an electric motor, or, in some instances, is driven by a separate gasoline engine. In the form illustrated, the hydraulic motor 21 is supplied with hydraulic fluid under pressure through the hoses 24 seen in FIG. 2, such hoses being connected to the pump and control valving which is essentially standard equipment in most farm trucks, and particularly those with dump boxes.

At the upper end of the auger tube, a transverse plate 25 closes the upper end of the auger tube 12 and provides a suitable mounting for a pump mounting block 26 which is secured to the plate 25 as by bolts 27. The block 26 has an enlarged interior circular opening 27.1 through which the stub end of auger shaft 22 extends. The hydraulic motor 21 has its own mounting plate 28 formed integrally of the case of the motor 21 and the mounting plate 28 is secured as by bolts 29 to the mounting block 26. A metering pump 30 is affixed as by screws 31 to the mounting flange 32 of a cylindrical sleeve 33 which is affixed by screws and mounting ears to the adjacent side of the mounting block 26. The interior opening 34 of the sleeve is aligned with a corresponding opening 35 in the mounting block 26.

A reciprocable drive rod 36 extends from the pump 30 through the interior opening of the sleeve 33 and through the opening 35 in the block and into the central opening 27.1 of the mounting block to engage the periphery of the eccentric or cam 37 which is affixed to the auger shaft 22 and also to the output drive shaft 38 of the hydraulic motor 21. The inner end 39 of the rod 36 constitutes a cam follower which is maintained in engagement with the periphery of the cam 37 by a compression spring 40 which encompasses the reduced end portion 41 of the drive rod 36 and bears at its opposite ends against a shoulder formed at the periphery of the drive rod 36 and also against plate 42 forming a part of pump 30. The reduced end portion 41 extends through a bearing aperture in plate 42 and has the reciprocating pump impeller 44 secured thereto. The impellor 44 includes a rigid metal stiffening plate 45, a rubber diaphragm 46 laying against the plate 45, and a protective laminae as of fiberglass or acid resisting plastic film 47 overlying the rubber diaphragm 46. The three layer on three part reciprocating impellor 44 is secured by a screw 48 to the end of the drive rod 36. The body 49 of the pump 30 defines a pump chamber 50, and the end plate 51 of the pump incorporates the inlet and outlet and check valves 52 and 53 which respectively allow flow of liquid treating material into an out of the pump chamber as the reciprocating impellor 44 is moved by the drive rod. The end plate 51 is secured to the pump body 49 as by screws 54.

The inlet 55 of the pump is connected by a rubber hose or duct 56 to a supply 57 of liquid treating material which is to be applied to the grain. The supply may be a container in which the liquid treating material is purchased and the container may be carried upon a shelf 58 affixed on the upright side wall of the grain box 18 and secured thereon as by straps or bands 59.

The outlet 60 of the pump 30 is connected by a hose or duct 61 to a fitting 62 which directs the liquid treating material into the auger tube. The fitting 62 incorporates a one way check valve 63 allowing liquid treating material to flow only inwardly toward the auger tube 12. The fitting 62 is threaded into a tapped aperture in a rigid band or strap 64 embracing the auger tube 12 and sealed thereto by a gasket 65 which surrounds the opening 66 formed in the auger tube. The inner threaded end 67 of the fitting 62 merely forms an open discharge duct through which the liquid treating material is discharged into the auger tube. It may be desirable under certain circumstances to incorporate a restricted opening or nozzle orifice into the inner end 67 of the fitting 62.

The hose 61 is preferably secured at several locations to the tube 12 by straps 68 which hold it in place.

The fitting 62 is located adjacent the lower end 13 of the auger tube, preferably in the lower half, and also preferably in the lower third of the auger tube, so that the liquid treating material is adequately mixed into the grain as the grain progresses upwardly toward the upper end 14 for discharge through the chute 15.

Means, indicated in general by numeral 69, are provided for varying the length of stroke of the drive rod 36, and correspondingly the quantity of liquid treating material pumped per revolution of the auger shaft 22 and the cam 37. Such means 69 include a stop bar 70 having a straight edge 71 and an opposite side 72 which is obliquely oriented with respect to edge 71 so as to form a wedge or taper. Accordingly, the bar 70 is of different widths along different portions of it. The bar 70 extends through an opening 73 in the reciprocating impellor drive rod 36. One side, 74, of the opening 73, is perpendicular to the length of rod 36, so that the edge 71 of the bar 70 will lie flush against it; and the other side 75 of the opening 73 is obliquely oriented with respect to the length of the reciprocating drive rod 36 and will lie parallel to the tapered edge 72 of the bar 70.

The bar 70 also extends through corresponding openings 76 and 77 in the opposite sides of the stationary mounting sleeve 33. The bar 70 is prevented from shifting endwise by a retainer hook 78 which is clamped by a thumb screw 79 and lock nut 80. The hook 78 has a finger 81 which lies transverse to the bar 70 and protrudes through one of the several notches 82 provided in the lower edge thereof, and the hook also has another finger 83 which also lies transverse to the bar 70 and across its upper tapered edge 72 so as to restrict any movement of the bar. When the hook has been swung into place around the mounting thumb screw 79, and with the finger 81 protruding through one of the notches 82, the bar 70 will be retained positively, in the desired position. If the bar 70 is to be readjusted, the hook 78 may be swung out of this way, allowing adjustment of the bar 70 in an endwise direction, and the fingers 83 and 81 will subsequently be swung back into the position illustrated for restricting any side to side movement of the bar 70.

In the use and operation of this apparatus, the lower end of the screw conveyor 11 is inserted into the supply 19 of grain in the box 18, and a suitable supply of liquid treating material is provided in the supply container 57.

The motor 21 of the screw conveyor is energized, by directing hydraulic fluid through it from the truck 19.

The auger tube 11 of the screw conveyor will be substantially full of grain during normal operation of the screw conveyor, thus assuredly causing a known quantity of grain to move upwardly through the auger tube by action of the rotating auger 23.

As the motor 21 revolves, its shaft 38 and the auger shaft 22 revolve as does the cam 37. The rotating of the auger shaft causes grain to be carried to the upper end 14 of the screw conveyor and the grain is subsequently discharged through the chute 15 to be deposited in the grain drill 20.

During each revolution of the cam 37, the reciprocating drive rod 36 will be moved outwardly under influence of the cam 37 and thence will be returned inwardly under influence of the spring 40 so as to reciprocate the impellor 44, causing a metered quantity of liquid treating material to be moved out through the outlet check valve 53 and the outlet 60 and subsequently causing an additional supply of the liquid treating material to be drawn from the supply 57 through the hose 56 and inlet 55 and check valve 52 into the pump chamber.

Because the pump 30 is a positive displacement pump with a reciprocating impellor 44, treating materials of different consistencies may be easily and readily handled by this pump. It has been found that certain treating materials are very thin and of high viscosity, and other treating materials are of low viscosity and quite thick in nature. However, the positive displacement reciprocating impellor pump will adequately move and direct the treating materials of all different natures into the grain through the outlet hose 61 and the fitting 62 from whence the treating material is directed into the auger tube 12 and the grain moving along therein.

As the cam 37 continues to revolve, the spring 40 will urge the reciprocating drive rod 36 toward the cam 37 until the side surface 75 of opening 73 in the drive rod 36 engages the tapered or obliquely oriented edge 72 of the bar 70, whereupon the drive rod stops and the reciprocating impellor 44 of the pump will also stop. Under this condition, as the cam 37 continues to revolve, the periphery of the cam may pull away from the cam follower end 39 of the rod and the rod will remain stationary for a portion of the operating cycle. Subsequently as the cam 37 continues to revolve, it will return into engagement with the cam follower 39 of the rod, and will again move the rod toward the pump chamber 50, causing the reciprocating impellor 44 to drive a quantity of the liquid treating material outwardly through the outlet 60.

The effect of the stop provided by the bar 70 is to limit the length of stroke of the rod 60 and the magnitude of movement of the reciprocating impellor 44 so as to limit the quantity of liquid treating material pumped during each cycle of operation.

In FIG. 3, if the bar 70 is readjusted and moved to the left, so as to allow a greater magnitude of movement of rod 36 away from pump chamber 50 and under influence of spring 40 during each cycle of operation, greater quantities of liquid treating material will be pumped during each stroke. Conversely, if the bar 70 is readjusted to the right so that the return movement of the rod 36 under influence of spring 40 is even more restricted, smaller quantities of the liquid treating material will be pumped during each cycle of operation.

It will therefore be understood that the present invention coordinates the flow of liquid treating material from the supply 57 and through the outlet fitting 62 and into the seed in the tube 12 in direct relation to the movement of the seed through the auger tube during each cycle of operation; and further, that the quantity of liquid being moved during each cycle of operation may be adjusted, this being accomplished by limiting the magnitude of the stroke of the rod 36 and of the reciprocating pump impellor 44 during each cycle.

In the form of the invention in FIG. 6, the screw conveyor 11.1 utilizes an electric motor 21.1 as its source of power, the motor being supplied with electricity from the battery of the truck or tractor upon which the screw conveyor is carried or mounted. In this form, the motor 21.1 is seen to be mounted on the conveyor tube 12.1 adjacent its lower end. A line shaft or drive shaft 85 extends entirely along the length of the exterior of the auger tube 12.1 and to the upper end thereof. The shaft 85 is carried in suitable bearings 86 and is connected to the drive motor 21.1 through a speed reducing gear box 87. The upper end of the auger drive shaft 22.1 is driven from shaft 85 by chain and sprocket 88.

In this form, the eccentric or cam 37.1 is mounted directly on the drive shaft 85 and is thereby revolved at a predetermined rate of speed relative to the auger shaft 22.1 and the auger revolved thereby. The pump 30.1 is operated at a coordinated rate relative to the rate of travel of grain moving through the auger tube. In this form of the invention as well as that in the form illustrated in FIGS. 1 – 5, the liquid treating material is carried through an outlet duct or hose 61.1 to the fitting 62.1 on the auger tube for applying the liquid treating material to the seeds in the lower portion of the auger tube.

In this form of the invention, the pump 30.1 is secured to the auger tube 12.1 by a mounting bracket 32.1.

In the form illustrated in FIG. 6, the electric motor 21.1 may readily be replaced with a gasoline engine, or power may be supplied directly to the gear box by the power take-off shaft from a conventional farm tractor. Although not necessary as a portion of this invention, a hopper 13.11 is illustrated attached to the lower end of the auger tube so that grain may be spilled from a dump box into the hopper to be conveyed through the screw conveyor.

In the form of the invention illustrated in FIG. 7, the screw conveyor 11.2 is arranged so that rotary power is applied to the auger shaft 22.2 at a location intermediate the end of the auger tube 12.2. A power take-off shaft 21.2 provides the rotary power from the external source in this instance and directs rotary power into a gear box 89 confined within the enlarged portion 12.22 of the auger tube. Another output shaft 37.22 from the gear box supplies rotary power to the cam or eccentric 37.2 which revolves with the shaft 37.22 and operates the metering pump 30.2 in a fashion substantially identical to that previously described. The pump 30.2 is a positive displacement reciprocating metering pump utilizing a reciprocating impellor as previously described. Again, as illustrated in FIG. 7, the outlet duct 61.2 is arranged to supply the treating material into the lower portion of the auger tube and the seeds being moved therethrough.

It will be understood that, although a power take-off shaft 21.2 from a tractor or truck is illustrated, this form of the invention applying power intermediate the ends of the auger and positioning the eccentric or cam 37.2 intermediate the ends of the auger tube, other forms of power may be utilized such as a gasoline engine, electric motor or hydraulic motor.

FIG. 8 illustrates another modified form wherein a screw conveyor 11.3 has its auger shaft 22.3 connected at its lower end through a universal or U-joint to an extension of the auger shaft 22.31. A suitable bearing 91 is carried in the bottom of a hopper frame 92 to be mounted on the back wall of a dump box from which grain is supplied into the hopper by a slide gate 93. A source of rotary power, constituting a gasoline engine 94, is carried on a mounting bracket 94.1 and drives through a belt and pulley connection 94.2 to the extension 22.31 of the auger shaft. The reciprocating metering pump 30.3, substantially identical to that illustrated in FIG. 3, is carried on a mounting bracket 32.3 and is operated by a revolving eccentric or cam 37.3 mounted directly on the extension 22.31 of the auger shaft. The outlet duct or hose 61.3 is connected to the fitting 62.3 in the lower portion of the auger tube 12.3 for applying the liquid treating material to the seed traveling through the auger tube.

Here again, in FIG. 8, the cam 37.3 revolves at a rate directly related to the speed of revolution of the auger shaft so as to operate the metering pump 30.3 at the desired rate. As previously described, an adjusting bar 70.3 operates substantially identical to bar 70 in FIG. 3 as to vary the quantity of material pumped per revolution of the auger shaft. In FIG. 9, an alternate form of reciprocating positive displacement pump 30.4 is illustrated. This form of pump incorporates a reciprocating impellor 44.4 which constitutes a piston operating in a pump chamber 50.4 defined by the housing 49.4. In this form of the invention the housing of the pump is carried on the supporting and connecting sleeve 33.4 which is mounted on the block and conveyor and auger tube in a manner substantially identical to that previously described in connection with FIG. 3. The end plate 51.4 has check valves provided therein to assure the proper direction of flow through the inlet 55.4 and outlet 60.4. The reciprocating impellor or piston 44.4 is driven by the drive rod 36.4 which is operated in a fashion substantially identical to that described in connection with FIG. 3. In pumping certain types of liquids, at certain viscosities, the piston pump illustrated in FIG. 9 has advantages over the diaphragm pump illustrated in FIG. 3.

In FIG. 10, the mounting block 26.5 is illustrated to carry two different reciprocating metering pumps 30.5 and 30.51, each of which is operated substantially identical to the manner described in connection wit pump 30 of FIG. 3. The auger shaft 22.5 in the auger tube 12.5 is driven by the hydraulic motor 21.5.

The separate pumps 30.5 and 30.51 are utilized with different supplies of liquid treating material and will direct their treating materials into the auger tube at slightly different locations, but facilitate applying a number of different treating materials to the same batch of seeds.

In FIG. 11, is illustrated an alternate drive for producing reciprocating motion of the reciprocating impellor 44.6. In this form, a variable eccentric, indicated in general by numeral 47.6, is to be driven with the auger shaft. The eccentric has a nut 37.61 carrying a spindle or pin 37.2 eccentrically related with respect to the rotation axis of the eccentric drive 37.6. A link 36.6 connects the pin to the reciprocating impellor 44.6 of the pump. The amount of eccentrically and therefore the magnitude of reciprocating movement may be changed by turning the screw 37.63 upon which the nut 37.61 is mounted. It will be recognized that the screw 37.63 is confined in a slot 37.64 and is connected to a lock nut and turning head 37.65 at the periphery of the rotor. By changing the eccentricity the magnitude of movement of the reciprocating impellor 44.6 is changed during each cycle of revolution, the frequency of which is controlled by the rotating of the auger shaft.

In FIG. 12, the auger shaft 22.7 turns the eccentric cam 37.7 which revolves in a non-rotating ring or keeper 95. The reciprocating impellor drive rod 36.7 is substantially the same as that illustrated in FIG. 3 excepting that in this form illustrated in FIG. 12, the rod has a bore 36.71 in the outer end thereof in which a slide rod 95.1 extends so that when the rod 36.7 is stopped by the bar 70, the slide rod or pin 95.1 may continue to withdraw away from the rod 36.7, allowing the eccentric to complete its stroke of operation. A heavy spring 36.72 is provided in the bore for the pin 95.1 to bear against as it drives the rod 36.7 for operating the pump impellor.

It will be seen that I have provided a new and improved apparatus for treating seed as the seed is conveyed from a container into the drill or other planting equipment in the field. The liquid treating material is pumped by the reciprocating metering pump into the seed being conveyed at a rate directly proportional to the speed of the seed and the quantity of liquid treating material pumped per revolution of the screw conveyor auger may be varied as well. In this invention, if there is no movement of the grain in the auger tube, there is no treating material being supplied into the grain, and likewise, if there are any obstructions or slow-downs which may occur, as due to a faulty electrical or hyraulic system, or a faulty gasoline motor or power take-off, the rate of applying of the treating material will slow down at a similar rate.

Figure 13:
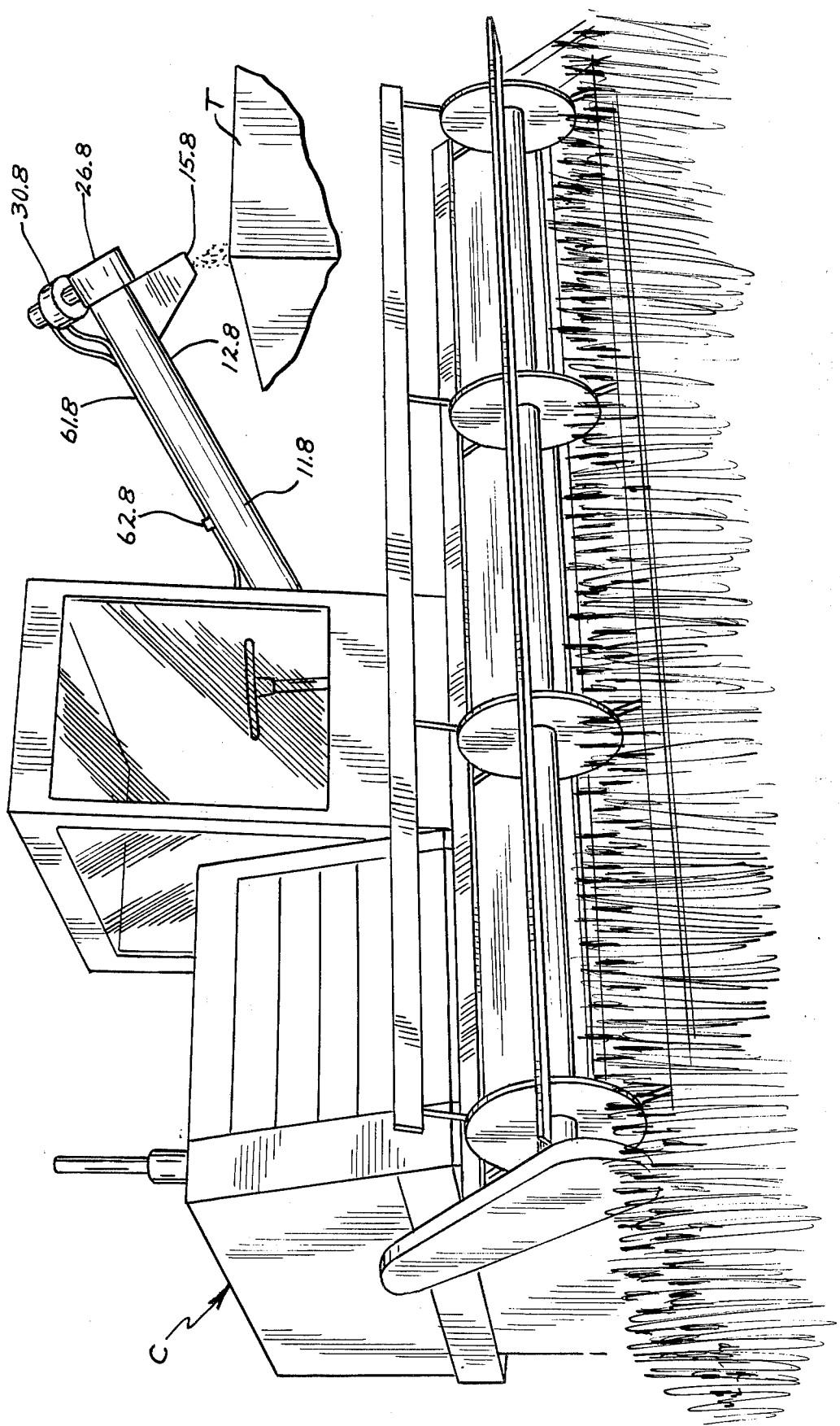
FIG. 13 is a perspective view of a grain harvesting combine with the seed treating equipment mounted on the truck loading screw conveyor thereof.

In FIG. 13, a grain harvesting combine is illustrated and indicated in general by the letter C. The combine is typical of those commonly in use in harvesting a small grain, such as wheat, oats, flax, rye, etc. The combine has the necessary apparatus for separating the grain seeds from the straw and chaff and temporarily storing the grain seeds in a bin from which the seed is loaded into trucks or wagons. In order to unload the combine and deposit the seed into a truck, a screw conveyor 11.8 protrudes from the combine outwardly to one side and has a discharge chute 15.8 which directs the seed and grain from the upper end of the auger tube 12.8 into the truck. The auger and auger shaft of the screw conveyor is powered from the engine of the combine C by means of a mechanical connection (not shown) at the lower end of the screw conveyor.

A pump 30.8 for liquid treating material, and substantially identical to the pump 30 illustrated in FIG. 3, is mounted adjacent the upper end of the screw conveyor 11.8 on the side of a mounting block 26.8 so that a cam connected on the end of the auger shaft of the screw conveyor 11.8 will operate the pump in the manner previously described in connection with earlier forms of this invention. The stroke of the pump is adjustable, as illustrated in FIG. 3, to vary the quantity of liquid treating material pumped for each stroke. The pump 30.8 discharges the treating material through a hose 61.8 which directs the liquid treating material into the auger tube 12 by means of the fitting 62.8, in a manner previously described.

The pump is operated whenever the auger of the screw conveyor is rotated by the engine of the combine C, and when the pump is supplied with the liquid treating material from a suitable source in a manner previously described herein, as illustrative in FIG. 1, the seed or grain being discharged from the combine will be initially treated before it enters the truck or wagon box B by which the seed is conveyed to storage bins. It should be understood that the liquid treating material may be any of a number of types of materials, such as innoculants, or preservatives, insecticides for control of weevils and other insects, chemicals for minimizing spoilage of high moisture grains, etc.

What is claimed is:

1. A combined seed conveyor and treater for applying liquid treating material to the seed, comprising:
a screw conveyor having an auger and a drive shaft therefor and an auger tube confining the auger and shaft, the auger tube having a lower seed receiving end and an upper end with a delivery chute from which the grain is discharged;
a metering pump having an impellor moving the liquid treating material through the pump, the pump having a liquid inlet connected to a source of liquid treating material and also having an outlet connected into the auger tube and applying treating liquid to the seed therein from the pump;
a source of rotary power during the auger and drive shaft of the screw conveyor and carrying grain through the auger tube into which the liquid treating material is being applied from the pump; and
means mechanically connecting the pump impellor to the auger shaft and operating the impellor at a rate directly related to the speed of the auger shaft whereby to move the liquid treating material through the pump and applying the liquid treating material to the seed at a rate related directly to the movement of the seed through the screw conveyor.

2. The invention according to claim 1 and said pump being a reciprocating positive displacement pump with a reciprocating impellor.

3. The invention according to claim 2 and said pump being a diaphragm pump.

4. The invention according to claim 2 and said pump being a piston pump.

5. The invention according to claim 2 and said means including a rotary eccentric mechanically connected to the auger shaft and revolving in a predetermined coordinated relation to the auger shaft, and a non-rotary, reciprocating impellor rod driven by the rotary eccentric and coordinating the rotation of the auger with the pumping of treating material.

6. The invention according to claim 5 and the eccentric comprising an eccentric rotary cam, the impellor rod having a cam follower on the end thereof at the cam periphery, and a spring continuously urging the impellor rod and cam follower toward the cam.

7. The invention according to claim 2 and said means including an adjustable connection between the shaft and the reciprocating impellor and changing the displacement of the impellor per revolution of the shaft for varying the quantity of liquid treating material applied to the seed for each turn of the auger.

8. The invention according to claim 6 and including a first stop stationary with the pump frame and a second stop connected with the impellor and confronting and abutting the first stop to limit the reciprocating impellor movement in one direction, one of the stops being adjustable relative to the other stop to change the limit of movement of the reciprocating impellor and thereby change the quantity of liquid treating material pumped during each stroke of the impellor rod.

9. The invention according to claim 8 and a reciprocating rod on the impellor, one of the stops including a rigid wedge extending transversely of the reciprocating rod and over a transversely oriented shoulder surface thereof to limit the travel of the reciprocating rod and impellor in one direction.

10. The invention according to claim 5 wherein the eccentric comprises a cam on the auger shaft adjacent the upper end of the auger tube, the pump being mounted on the upper end of the auger tube with the impellor rod engaging the cam and being reciprocated thereby.

11. The invention according to claim 5 and means connecting the eccentric to the auger shaft intermediate the ends thereof.

12. The invention according to claim 5 and means connecting the eccentric to the auger shaft adjacent the lower seed receiving end of the auger tube.

13. The invention according to claim 5 and the source of power including a drive shaft at the exterior of the auger tube and having coupling means connecting the drive shaft to the auger shaft adjacent the upper end of the auger tube, and said rotary eccentric being connected to and driven by said drive shaft to operate the pump.

14. A seed treating apparatus for use with a screw conveyor having an auger tube with an auger and auger shaft therein and a source of rotary power to drive the auger shaft, comprising:
a reciprocating positive displacement pump with a reciprocating impellor and having mounting means securing the pump is predetermined relation to the auger tube, the pump having an inlet with a duct connected therewith to supply liquid treating material from a supply, and the pump also having an outlet with a liquid flow duct being provided with a fitting attachable into the auger tube for directing unidirectional flow of liquid treating material into the seed carried through the auger tube; and
a rotary eccentric mechanically connected to the auger shaft and being located adjacent said pump, a reciprocating impellor rod connected to the reciprocating impellor of the pump and having connection to the eccentric to be reciprocated thereby as the eccentric revolves with the auger shaft.

15. In combination with a screw conveyor having an auger tube confining an auger and an auger shaft, and having an open lower end receiving seed therein and an upper end with a discharge chute and a motor at said upper end for driving the auger shaft;
a source of liquid treating material;
a mounting block interposed between the upper end of the auger tube and said motor and having an opening therethrough to accommodate the end of the auger shaft and the output shaft from the drive motor;
an eccentric cam coupled with the auger shaft and drive shaft of the motor and revolving therewith;
a reciprocating positive displacement metering pump on said block and having a reciprocating impellor extending toward said cam with a cam follower end on the impellor bearing against the cam, the pump including a spring continuously urging the rod and cam follower toward the cam, and a stationary sleeve surrounding said impellor rod, the pump having an inlet and a supply duct connecting the inlet with said source of liquid treating material, and the pump also having an outlet and a liquid carrying duct extending from the outlet downwardly along the exterior of the auger tube toward the lower end thereof and being provided with a fitting connecting into the auger tube and directing flow of liquid treating material from the pump into the auger tube and seeds carried thereby, said fitting including a unidirectional flow value permitting flow only from the outlet into the auger tube, and said impeller rod and encompassing sleeve therefor having aligned openings extending transversely of the impellor rod, and a wedge shaped stop extending transversely through the sleeve and impellor rod and limiting movement of the rod toward the cam to limit the return stroke of the impellor rod and impellor.

* * * * *

UNITED STATES PATENT AND TRADEMARK OFFICE
CERTIFICATE OF CORRECTION

PATENT NO. : 4,023,525
DATED : May 17, 1977
INVENTOR(S) : Joseph A. Weber

It is certified that error appears in the above-identified patent and that said Letters Patent are hereby corrected as shown below:

In claim 14, line 38, delete "is" and insert --in--.

Signed and Sealed this twenty-sixth Day of July 1977

[SEAL]

Attest:

RUTH C. MASON
Attesting Officer

C. MARSHALL DANN
Commissioner of Patents and Trademarks